United States Patent
Hanada et al.

(10) Patent No.: US 12,181,759 B2
(45) Date of Patent: Dec. 31, 2024

(54) DISPLAY DEVICE

(71) Applicant: Japan Display Inc., Tokyo (JP)

(72) Inventors: Akihiro Hanada, Tokyo (JP); Hitoshi Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/457,350

(22) Filed: Aug. 29, 2023

(65) Prior Publication Data
US 2024/0069396 A1    Feb. 29, 2024

(30) Foreign Application Priority Data
Aug. 30, 2022    (JP) ................................ 2022-136962

(51) Int. Cl.
*G02F 1/1362*    (2006.01)

(52) U.S. Cl.
CPC .. *G02F 1/136222* (2021.01); *G02F 1/136286* (2013.01)

(58) Field of Classification Search
CPC .................................................. G02F 1/1362
See application file for complete search history.

(56) References Cited

U.S. PATENT DOCUMENTS

| | | | | |
|---|---|---|---|---|
| 2007/0002200 A1* | 1/2007 | Ashizawa | ............... | H01L 27/12 |
| | | | | 257/E27.111 |
| 2015/0241723 A1* | 8/2015 | Ochiai | ............. | G02F 1/136277 |
| | | | | 349/43 |
| 2018/0107078 A1* | 4/2018 | Ishigaki | .............. | H01L 27/1222 |
| 2020/0285090 A1* | 9/2020 | Tanaka | ................. | G02F 1/1368 |
| 2020/0371401 A1* | 11/2020 | Kitagawa | .......... | H01L 29/78633 |
| 2021/0109412 A1* | 4/2021 | Suzumura | ......... | G02F 1/136286 |
| 2022/0163857 A1* | 5/2022 | Watanabe | ......... | G02F 1/136286 |
| 2022/0326581 A1 | 10/2022 | Kimura et al. | | |
| 2022/0373846 A1* | 11/2022 | Kimura | ............. | G02F 1/136222 |
| 2023/0205023 A1* | 6/2023 | Kimura | ............. | G02F 1/136222 |
| | | | | 349/106 |

FOREIGN PATENT DOCUMENTS

JP    WO 2018199037    * 11/2018    .......... G02F 1/1368
JP    2021-135387 A    9/2021

* cited by examiner

*Primary Examiner* — Sang V Nguyen
(74) *Attorney, Agent, or Firm* — XSENSUS LLP

(57) ABSTRACT

According to one embodiment, a display device includes a transparent semiconductor, a first insulating layer, a gate electrode, a second insulating layer, a source electrode, a third insulating layer, a transparent electrode which is in contact with the semiconductor in a second contact hole penetrating the first insulating layer, the second insulating layer and the third insulating layer, a fourth insulating layer, a color filter, and a pixel electrode electrically connected to the transparent electrode. The first insulating layer and the second insulating layer are silicon oxide layers. At least one of the third insulating layer and the fourth insulating layer is a silicon nitride layer.

13 Claims, 9 Drawing Sheets

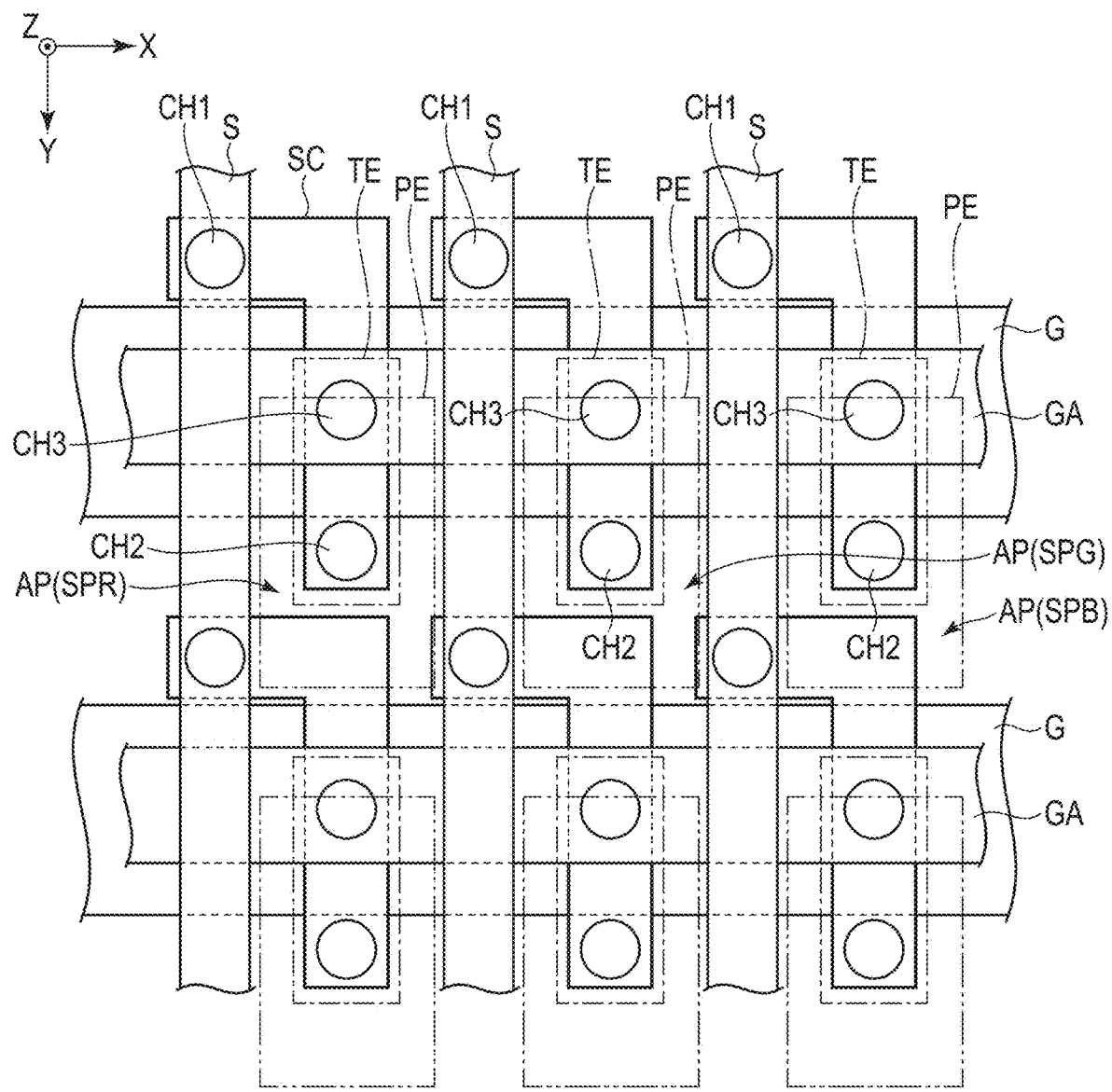
F I G. 5

DISPLAY DEVICE

CROSS-REFERENCE TO RELATED APPLICATIONS

This application is based upon and claims the benefit of priority from Japanese Patent Application No. 2022-136962, filed Aug. 30, 2022, the entire contents of which are incorporated herein by reference.

FIELD

Embodiments described herein relate generally to a display device.

BACKGROUND

As an example of display devices which can perform color display, liquid crystal display devices having a color filter on array (COA) system, in which an array substrate comprises a switching element, a pixel electrode and a color filter, are suggested.

For liquid crystal display devices used for virtual reality (VR), a high definition of 1300 ppi or greater is required. Thus, the pixels are extremely small. For this reason, liquid crystal display devices having a COA system are suitable for the use for VR as they are not affected by the misalignment of a pair of substrates.

However, in display devices with high definition, the contact holes formed in pixels are small. Thus, the prevention of the reduction in the manufacturing yield by a connection failure of various types of electrodes is required.

BRIEF DESCRIPTION OF THE DRAWINGS

FIG. 5 is a schematic plan view of the structure of subpixels SPR, SPB and SPG.

DETAILED DESCRIPTION

Figure 1:
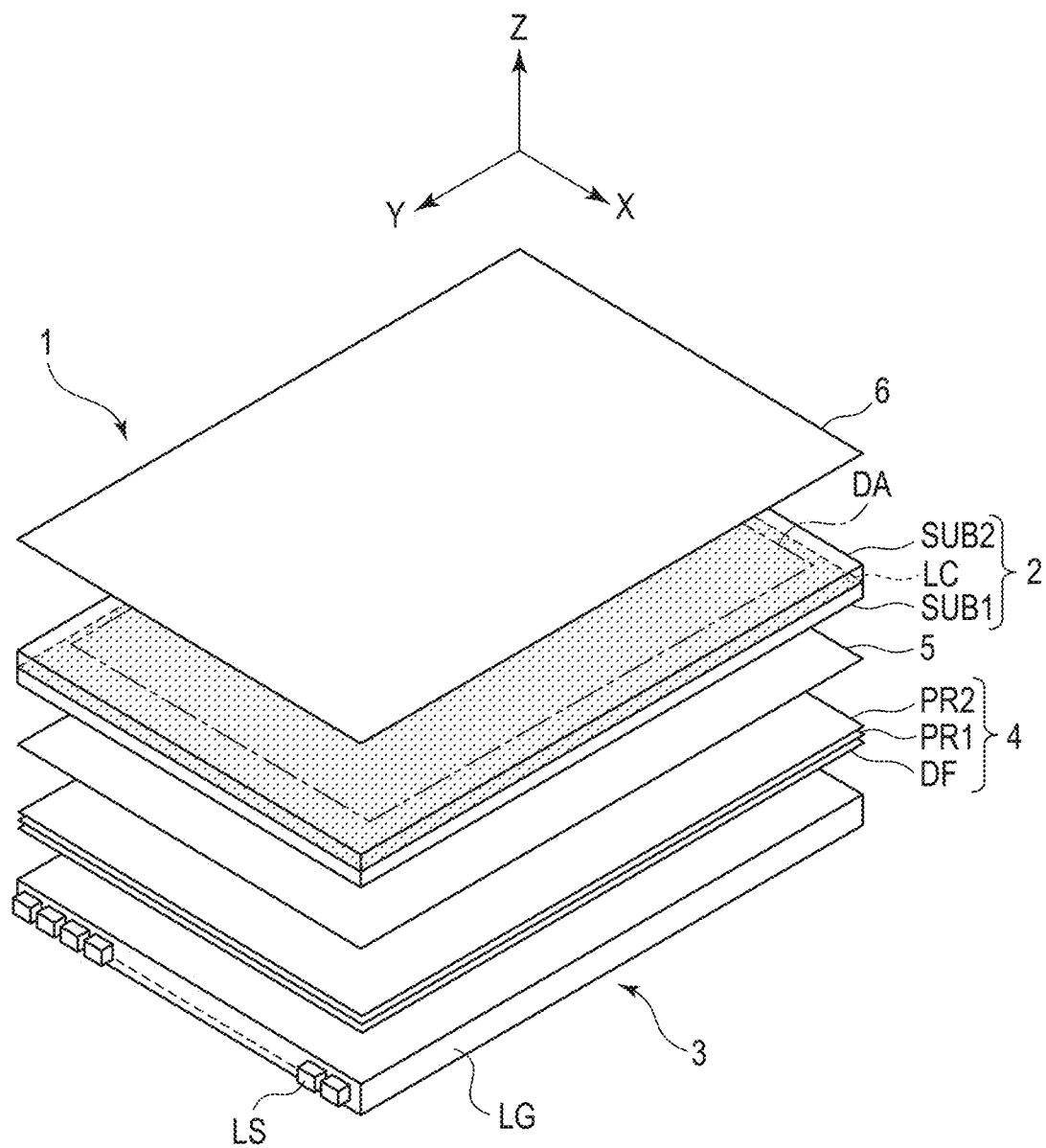
FIG. 1 is a schematic exploded perspective view of a display device 1 according to an embodiment.

Embodiments described herein aim to provide a display device which can prevent the reduction in the manufacturing yield.

In general, according to one embodiment, a display device comprises a substrate, a transparent semiconductor provided above the substrate, a first insulating layer which covers the semiconductor, a gate electrode which is provided on the first insulating layer and intersects with the semiconductor, a second insulating layer which covers the gate electrode, a source electrode which is provided on the second insulating layer and is in contact with the semiconductor in a first contact hole penetrating the first insulating layer and the second insulating layer, a third insulating layer which covers the source electrode, a transparent electrode which is provided on the third insulating layer and is in contact with the semiconductor in a second contact hole penetrating the first insulating layer, the second insulating layer and the third insulating layer, a fourth insulating layer which covers the transparent electrode, a color filter provided on the fourth insulating layer, a pixel electrode which is provided above the color filter, faces the color filter and is electrically connected to the transparent electrode, and a common electrode which faces the pixel electrode. The first insulating layer and the second insulating layer are silicon oxide layers. At least one of the third insulating layer and the fourth insulating layer is a silicon nitride layer.

The embodiments provide a display device which can prevent the reduction in the manufacturing yield.

Embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the present embodiment, as an example of display devices, a liquid crystal display device is disclosed. It should be noted that the technical idea disclosed in the present embodiment can be applied to, as other display devices, for example, display devices comprising other types of display elements such as an organic electroluminescent display element, a micro-LED or mini-LED. The technical idea disclosed in the present embodiment can be also applied to an array substrate or electronic device which comprises a sensor element such as a capacitive sensor or an optical sensor.

FIG. 1 is a schematic exploded perspective view of a display device 1 according to an embodiment.

In the drawings, in order to facilitate understanding, an X-axis, a Y-axis and a Z-axis orthogonal to each other are shown depending on the need. A direction parallel to the X-axis is referred to as a first direction. A direction parallel to the Y-axis is referred to as a second direction. A direction parallel to the Z-axis is referred to as a third direction. The first direction X and the second direction Y correspond to directions parallel to the main surfaces of the substrates constituting the display device 1. The third direction Z corresponds to the thickness direction of the display device 1. When various elements are viewed parallel to the third direction Z, the appearance is defined as a plan view. The positive direction of the Z-axis is referred to as "on" or "above". The negative direction of the Z-axis is referred to as "below" or "under". When terms defining the positional relationships of two or more elements, such as "on", "below" and "face", are used, the target elements may be directly in contact with each other or may be spaced apart from each other as a gap or another element is interposed between them.

The display device 1 comprises a display panel 2 and an illumination device 3. In the example of FIG. 1, the illumination device 3 is a side-edge type of illumination device and comprises a light guide LG which faces the display panel 2, and a plurality of light emitting elements LS which face a side surface of the light guide LG. It should be noted that the illumination device 3 is not limited to the example of FIG. 1 and may comprise another configuration such as a direct type.

In the example of FIG. 1, each of the display panel 2 and the light guide LG is formed into a rectangle comprising short sides parallel to the first direction X and long sides parallel to the second direction Y. However, the shape of the display panel 2 or the light guide LG is not limited to a rectangle and may be another shape.

The display panel 2 is a transmissive liquid crystal panel and comprises a first substrate (array substrate) SUB1, a second substrate (counter-substrate) SUB2 which faces the first substrate SUB1, and a liquid crystal layer LC provided between the first substrate SUB1 and the second substrate SUB2. The display panel 2 comprises, for example, a rectangular display area DA.

The display device 1 further comprises an optical sheet group 4, a first polarizer 5 and a second polarizer 6. The optical sheet group 4 is provided between the light guide LG and the display panel 2. For example, the optical sheet group 4 includes a diffusion sheet DF which diffuses the light emitted from the light guide LG, and first and second prism sheets PR1 and PR2 in which a large number of prisms are formed. It should be noted that, in the optical sheet group 4, at least one of the above optical sheets may be omitted, or another optical sheet may be added. A plurality of optical sheets comprising the same function may be used.

The first polarizer 5 is provided between the optical sheet group 4 and the first substrate SUB1. The second polarizer 6 is provided above the second substrate SUB2. The polarization axis of the first polarizer 5 and the polarization axis of the second polarizer 6 have, for example, a crossed-Nicol relationship in which the polarization axes are orthogonal to each other. It should be noted that the angle of intersection of the polarization axes may be appropriately changed.

The display device 1 may be used for various devices such as a vehicle-mounted device, a smartphone, a tablet, a mobile phone, a personal computer, a television receiver, a game console and a head-mounted display.

Figure 2:
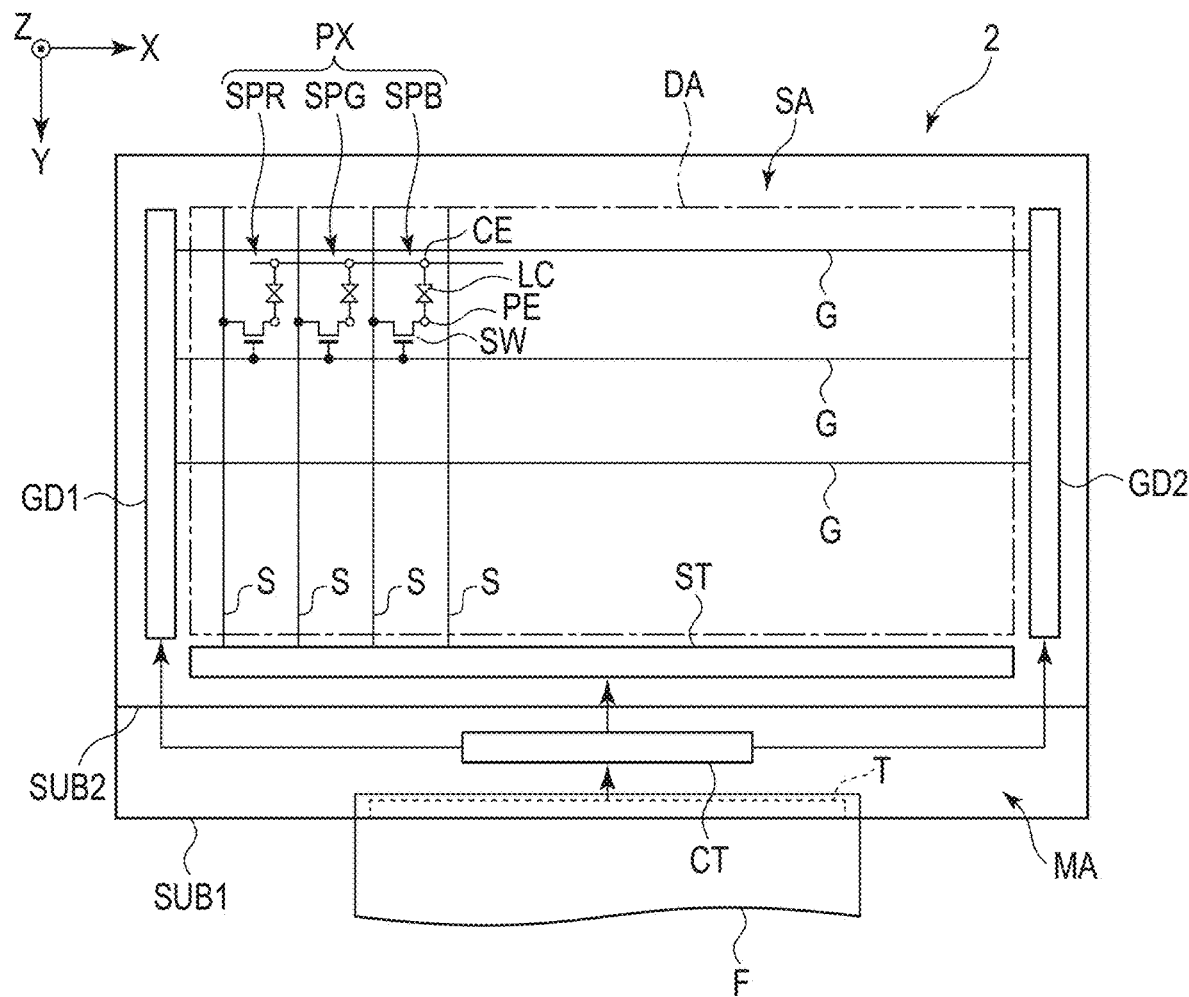
FIG. 2 is a schematic plan view of a display panel 2.

FIG. 2 is a schematic plan view of the display panel 2.

The display panel 2 comprises the display area DA configured to display an image, and a surrounding area SA around the display area DA. In the example of FIG. 2, the lower side of the first substrate SUB1 protrudes in the second direction Y relative to the second substrate SUB2. By this structure, a mounting area MA which does not overlap the second substrate SUB2 is formed in the first substrate SUB1. The mounting area MA is part of the surrounding area SA.

The display area DA comprises a plurality of pixels PX provided in matrix in the first direction X and the second direction Y. Each pixel PX includes a plurality of subpixels. In the present embodiment, for example, each pixel PX includes a red subpixel SPR, a green subpixel SPG and a blue subpixel SPB. It should be noted that each pixel PX may include a subpixel which exhibits another color such as white. It should be noted that each pixel PX may consist of two subpixels SP or four or more subpixels SP.

The display panel 2 comprises a plurality of scanning lines G, a plurality of signal lines S, scanning drivers GD1 and GD2 and a selector circuit ST. The scanning lines G extend in the first direction X and are arranged in the second direction Y. The signal lines S extend in the second direction Y and are arranged in the first direction X. The scanning lines G are connected to at least one of the scanning driver GD1 and the scanning driver GD2. The signal lines S are connected to the selector circuit ST.

In the example of FIG. 2, a controller CT is mounted in the mounting area MA. A terminal portion T is provided in the mounting area MA. A flexible printed circuit F is connected to the terminal portion T. It should be noted that the controller CT may be mounted in the flexible printed circuit F. The controller CT may consist of an IC chip and various types of circuit elements.

The controller CT controls the scanning drivers GD1 and GD2 and also controls the selector circuit ST. The scanning drivers GD1 and GD2 supply scanning signals to the scanning lines G in series. The selector circuit ST supplies video signals to the signal lines S in series.

Each of subpixels SPR, SPG and SPB includes a pixel electrode PE, a switching element (thin-film transistor) SW and a common electrode CE to which common voltage is applied. The switching element SW is electrically connected to the pixel electrode PE, the scanning line G and the signal line S. The common electrode CE is formed over a plurality of subpixels. When a potential difference is formed between the pixel electrode PE and the common electrode CE, an electric field based on the potential difference is formed in the liquid crystal layer LC.

In the present embodiment, all of the scanning lines G, the signal lines S, the scanning drivers GD1 and GD2, the selector circuit ST, the switching elements SW, the pixel electrodes PE and the common electrode CE are formed in the first substrate SUB1.

Figure 3:
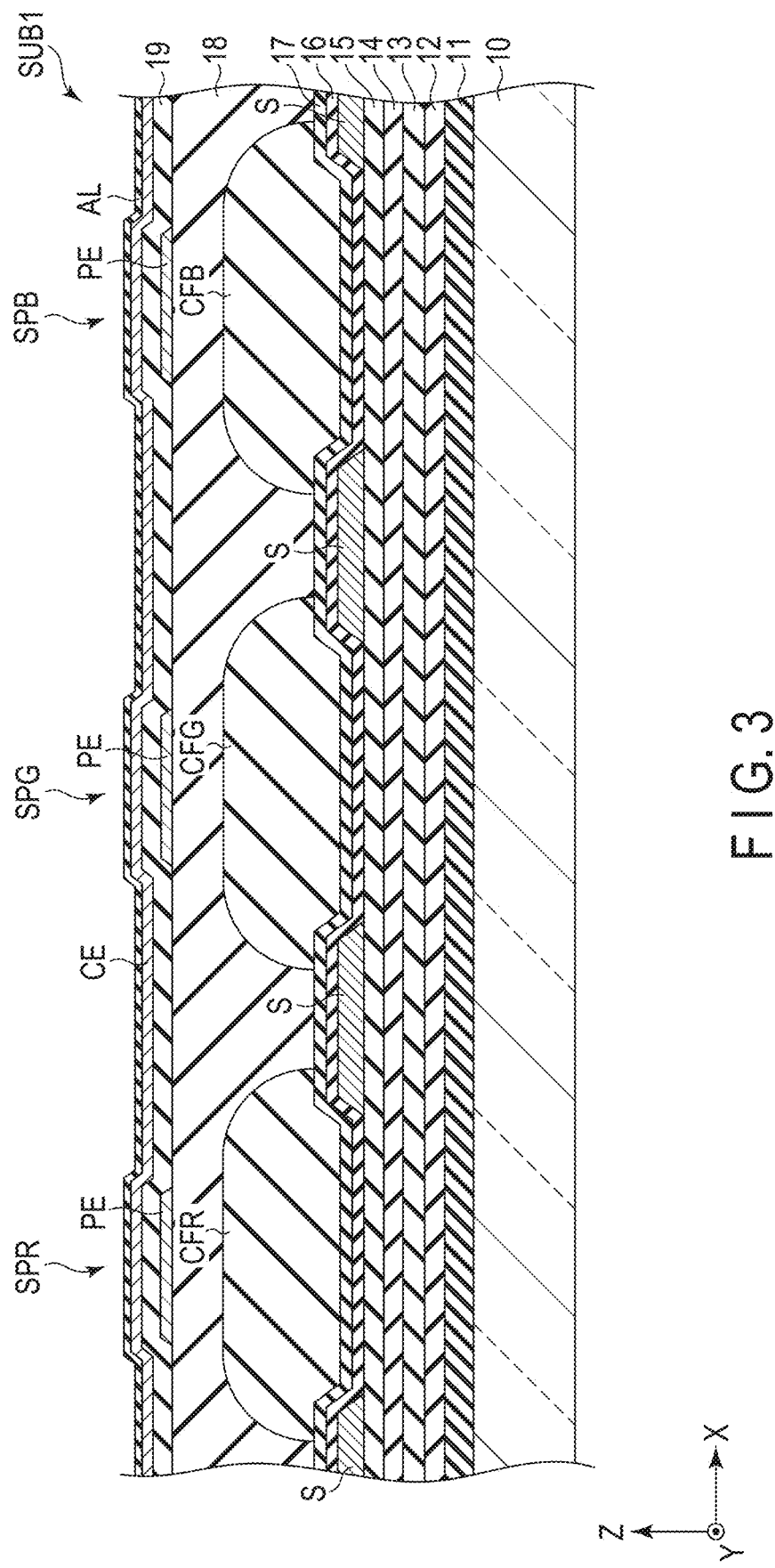
FIG. 3 is a schematic cross-sectional view of a first substrate SUB1 in the first direction X of the pixels PX shown in FIG. 2.

FIG. 3 is a schematic cross-sectional view of the first substrate SUB1 in the first direction X of the pixels PX shown in FIG. 2.

The first substrate SUB1 comprises a substrate 10, insulating layers 11 to 19, an alignment film AL and color filters CFR, CFG and CFB in addition to the signal lines S, pixel electrodes PE and common electrode CE described above.

The substrate 10 is, for example, a transparent insulating substrate such as a glass substrate or resinous substrate.

The insulating layers 11 to 15 are stacked in order on the substrate 10. The signal lines S are provided on the insulating layer 15 in the boundaries of subpixels which are adjacent to each other in the first direction X. The insulating layer 16 covers the signal lines S and the insulating layer 15. The insulating layer 17 covers the insulating layer 16. The color filter CFR is provided on the insulating layer 17 in subpixel SPR. The color filter CFG is provided on the insulating layer 17 in subpixel SPG. The color filter CFB is provided on the insulating layer 17 in subpixel SPB. In the section shown in the figure, the color filters CFR, CFG and CFB are spaced apart from each other immediately above the signal lines S. When the illumination light emitted from the illumination device 3 passes through the color filter CFR, red transmitted light is generated. When illumination light passes through the color filter CFG, green transmitted light is generated. When illumination light passes through the color filter CFB, blue transmitted light is generated.

The insulating layer 18 covers the color filters CFR, CFG and CFB and further covers the insulating layer 17 immediately above the signal lines S. The insulating layer 18 is formed so as to be thicker than the other insulating layers 11 to 17 and 19 and functions as a planarization film which planarizes the irregularities formed by the color filters CFR, CFG and CFB, etc.

The pixel electrodes PE are provided on the insulating layer 18 in subpixels SPR, SPG and SPB. The insulating layer 19 covers the pixel electrodes PE and the insulating layer 18. The common electrode CE is provided on the insulating layer 19. In each of subpixels SPR, SPG and SPB, the pixel electrode PE faces the common electrode CE via the insulating layer 19. The alignment film AL covers the common electrode CE.

Although not shown in the section of FIG. 3, the common electrode CE comprises a slit in each of subpixels SPR, SPG and SPB. An electric field which affects the liquid crystal layer LC is formed between the pixel electrodes PE and the common electrode CE through these slits.

The insulating layers 11 to 17 and 19 are inorganic insulating layers. The insulating layer 18 is an organic insulating layer. Each of the insulating layers 11 and 12 is formed of an inorganic insulating material such as silicon nitride or silicon oxide. The insulating layers 13 to 15 are formed of silicon oxide. The insulating layers 16 and 17 are formed of silicon nitride or silicon oxide. The insulating layer 18 is formed of an organic insulating material such as acrylic resin. The insulating layer 19 is formed of silicon nitride.

The alignment film AL is formed of, for example, polyimide, and is a horizontal alignment film having an alignment restriction force parallel to the X-Y plane. Each of the color filters CFR, CFG and CFB is formed of, for example, a negative resist.

The pixel electrodes PE and the common electrode CE are formed of a transparent conductive material such as indium tin oxide (ITO). The signal lines S and the scanning lines G shown in FIG. 1 are formed of a metal material such as titanium, aluminum, molybdenum or tungsten. The signal lines S and the scanning lines G may be formed of a single-layer body or may be formed of a stacked layer body in which different types of metal layers are stacked.

The structure of the first substrate SUB1 is not limited to the example of FIG. 3. For example, the pixel electrodes PE may be provided on the upper side (the liquid crystal layer LC side) relative to the common electrode CE.

This COA system is suitable for a display device which requires a high definition exceeding 1400 ppi.

The illustration of the section of the second substrate SUB2 is omitted. However, the second substrate SUB2 comprises the same insulating substrate and alignment film as the first substrate SUB1. Preferably, the second substrate SUB2 should not comprise a light-shielding layer such as a black matrix. In this structure, even in a case where misalignment is caused when the first substrate SUB1 and the second substrate SUB2 are attached to each other, the display quality of the display device 1 can be satisfactorily maintained.

Figure 4:
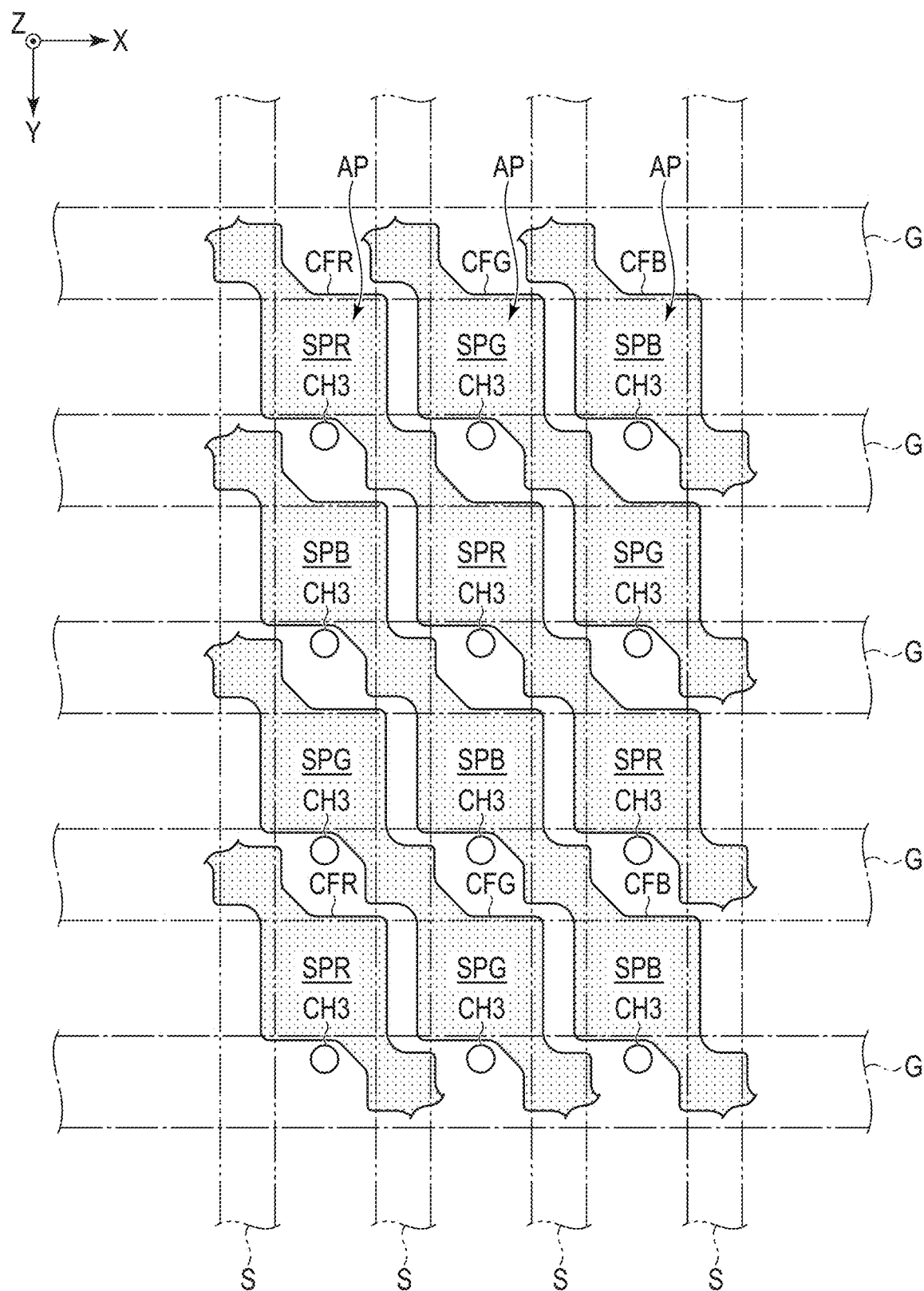
FIG. 4 is a schematic plan view of some of the elements provided in the first substrate SUB1.

FIG. 4 is a schematic plan view of some of the elements provided in the first substrate SUB1.

This figure shows examples of the shapes of the scanning lines G, the signal lines S and the color filters CFR, CFG and CFB.

In the example of FIG. 4, the scanning lines G linearly extend in the first direction X, and the signal lines S linearly extend in the second direction Y. The width of each scanning line G in the second direction Y is greater than the width of each signal line S in the first direction X. The scanning lines G or signal lines S are not necessarily linear and may include a curved portion.

The scanning lines G and the signal lines S intersect each other. The area surrounded by two adjacent scanning lines G and two adjacent signal lines S corresponds to the aperture AP of a subpixel. Each of subpixels SPR, SPG and SPB comprises the aperture AP.

In the example of FIG. 4, subpixels SPR, SPG and SPB are arranged in order in the first direction X, and subpixels SPR, SPB and SPG are arranged in order in the second direction Y. In this layout form, in the display area DA, a line in which a plurality of subpixels SPR are arranged in an oblique direction intersecting with the first direction X and the second direction Y, a line in which a plurality of subpixels SPG are arranged in the oblique direction and a line in which a plurality of subpixels SPB are arranged in the oblique direction are alternately formed.

The color filter CFR is provided in each line of subpixels SPR which are arranged in the oblique direction. In other words, the color filter CFR provided in subpixels SPR which are adjacent to each other in the oblique direction is integrally formed. In each subpixel SPR, the color filter CFR overlaps the aperture AP.

The color filter CFG is provided in each line of subpixels SPG which are arranged in the oblique direction. In each subpixel SPG, the color filter CFG overlaps the aperture AP.

The color filter CFB is provided in each line of subpixels SPB which are arranged in the oblique direction. In each subpixel SPB, the color filter CFB overlaps the aperture AP.

These color filters CFR, CFG and CFB are spaced apart from each other in the areas overlapping the scanning lines G and the signal lines S. As explained later, a contact hole CH3 for connecting the pixel electrode to a transparent electrode overlaps the scanning line G and does not overlap the color filter CFR, CFG or CFB in each of subpixels SPR, SPB and SPG.

FIG. 5 is a schematic plan view of the structure of subpixels SPR, SPB and SPG.

In FIG. 5, transparent electrodes TE are shown by alternate long and short dash lines, and the pixel electrodes PE are shown by alternate long and two short dashes lines, and the illustrations of the color filters and the common electrode are omitted.

The scanning lines G and upper scanning lines GA are electrically connected to each other. The upper scanning lines GA overlap the scanning lines G and linearly extend in the first direction X. The width of each upper scanning line GA in the second direction Y is less than that of each scanning line G in the second direction Y.

Each transparent electrode TE is provided between adjacent signal lines S, overlaps the scanning line G and the upper scanning line GA and extends to the aperture AP.

Semiconductors SC intersect with the signal lines S, further intersect with the scanning lines G and the upper scanning lines GA and extend to the apertures AP. The semiconductors SC are electrically connected to the signal lines S in contact holes CH1. The semiconductors SC are electrically connected to the transparent electrodes TE in contact holes CH2. Each contact hole CH2 is located in the aperture AP and overlaps one of the color filters CFR, CFG and CFB shown in FIG. 4.

Each pixel electrode PE is provided between adjacent signal lines S, overlaps the scanning line G and the upper scanning line GA and extends to the aperture AP. The pixel electrodes PE are electrically connected to the transparent electrodes TE in the contact holes CH3. The contact holes CH3 overlap the scanning lines G and the upper scanning lines GA.

Figure 6:
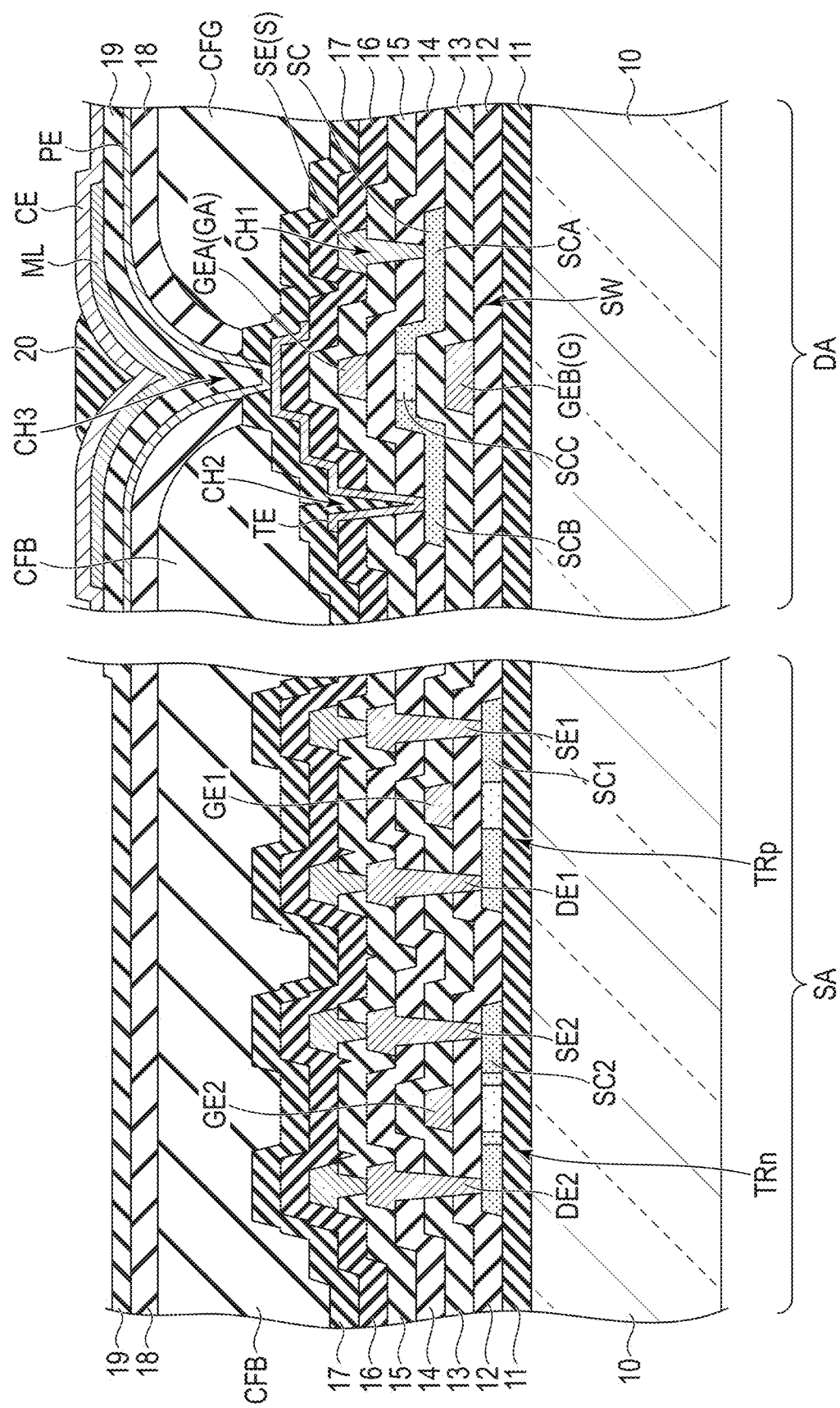
FIG. 6 is a schematic cross-sectional view of the first substrate SUB1 along the semiconductors SC shown in FIG. 5.

FIG. 6 is a schematic cross-sectional view of the first substrate SUB1 along the semiconductors SC shown in FIG. 5.

FIG. 6 shows the section of the surrounding area SA in addition to the section of the display area DA.

In the display area DA, the semiconductor SC of the switching element SW is provided on the insulating layer 13 and is covered with the insulating layer 14. The semiconductor SC is transparent, and is, for example, an oxide semiconductor containing indium or gallium. The semiconductor SC comprises low-resistive areas SCA and SCB and a high-resistive area SCC. The high-resistive area SCC is located between the low-resistive area SCA and the low-resistive area SCB. The semiconductor SC is located between the insulating layer 13 which is a silicon oxide layer and the insulating layer 14 which is a silicon oxide layer.

A lower gate electrode GEB is provided on the insulating layer 12 and is covered with the insulating layer 13. The lower gate electrode GEB is included in the scanning line G shown in FIG. 5. The lower gate electrode GEB faces the semiconductor SC via the insulating layer 13. In other words, the lower gate electrode GEB corresponds to, of the scanning line G, the area which overlaps the semiconductor SC.

A gate electrode GEA is provided on the insulating layer 14 and is covered with the insulating layer 15. The gate electrode GEA is included in the upper scanning line GA shown in FIG. 5. The gate electrode GEA faces the high-resistive area SCC of the semiconductor SC via the insulating layer 14. In other words, the gate electrode GEA corresponds to, of the upper scanning line GA, the area which overlaps the semiconductor SC.

A source electrode SE is provided on the insulating layer 15 and is covered with the insulating layer 16. The source electrode SE is included in the signal line S shown in FIG. 5. The source electrode SE is in contact with the low-resistive area SCA of the semiconductor SC in the contact hole CH1 which penetrates the insulating layer 14 and the insulating layer 15.

The transparent electrode TE is provided on the insulating layer 16 and is covered with the insulating layer 17. In other words, the transparent electrode TE is formed in a layer different from the signal line S. The transparent electrode TE is formed of a transparent conductive material such as ITO. The transparent electrode TE is in contact with the low-resistive area SCB of the semiconductor SC in the contact hole CH2 which penetrates the insulating layer 14, the insulating layer 15 and the insulating layer 16. The contact hole CH2 overlaps the color filter. In the example shown in the figure, the contact hole CH2 overlaps the color filter CFB.

The pixel electrode PE is provided on the insulating layer 18 and is covered with the insulating layer 19. The pixel electrode PE is in contact with the transparent electrode TE in the contact hole CH3 which penetrates the insulating layer 17 and the insulating layer 18. The contact hole CH3 overlaps the gate electrode GEA and does not overlap any color filter.

A metal layer ML is provided on the insulating layer 19 in the contact hole CH3. The common electrode CE covers the metal layer ML, is provided on the insulating layer 19 and is covered with the alignment film AL shown in FIG. 3. In other words, the metal layer ML and the common electrode CE are electrically connected to each other and have the same potential. In the example shown in the figure, the metal layer ML is located between the insulating layer 19 and the common electrode CE. However, the common electrode CE may be located between the insulating layer 19 and the metal layer ML. In the example shown in the figure, the recess generated by the contact hole CH3 is filled with a filling material 20. The filling material 20 is formed of an organic insulating material, is provided on the common electrode CE and is covered with the alignment film AL.

In the surrounding area SA, a p-channel type of transistor TRp and an n-channel type of transistor TRn are provided. In the example shown in the figure, the blue color filter CFB overlaps the transistor TRp and the transistor TRn.

The transistor TRp comprises a semiconductor SC1 containing p-type impurities such as boron. The semiconductor SC1 is provided on the insulating layer 11 and is covered with the insulating layer 12. The semiconductor SC1 comprises a low-concentration area in which the concentration of impurities is low and a high-concentration area in which the concentration of impurities is high. A gate electrode GE1 is provided on the insulating layer 12 and is covered with the insulating layer 13. The gate electrode GE1 faces the low-concentration area of the semiconductor SC1 via the insulating layer 12. A source electrode SE1 and a drain electrode DE1 are provided on the insulating layer 14 and are covered with the insulating layer 15. Each of the source electrode SE1 and the drain electrode DE1 is in contact with the high-concentration area of the semiconductor SC1 in the contact hole which penetrates the insulating layer 12, the insulating layer 13 and the insulating layer 14.

The transistor TRn comprises a semiconductor SC2 containing n-type impurities such as phosphorus. The semiconductor SC2 is provided on the insulating layer 11 and is covered with the insulating layer 12. The semiconductor SC2 comprises a low-concentration area in which the concentration of impurities is low and a high-concentration area in which the concentration of impurities is high. A gate electrode GE2 is provided on the insulating layer 12 and is covered with the insulating layer 13. The gate electrode GE2 faces the low-concentration area of the semiconductor SC2 via the insulating layer 12. A source electrode SE2 and a drain electrode DE2 are provided on the insulating layer 14 and are covered with the insulating layer 15. Each of the source electrode SE2 and the drain electrode DE2 is in contact with the high-concentration area of the semiconductor SC2 in the contact hole which penetrates the insulating layer 12, the insulating layer 13 and the insulating layer 14.

The semiconductors SC1 and SC2 are formed of polycrystalline silicon. The gate electrodes GE1 and GE2 are located in the same layer as the lower gate electrode GEB and the scanning line G and are formed of the same material (for example, an alloy of molybdenum and tungsten) as the lower gate electrode GEB. The source electrode SE1, the drain electrode DE1, the source electrode SE2 and the drain electrode DE2 are located in the same layer as the gate electrode GEA and the upper scanning line GA and are formed of the same material (for example, a stacked layer body of a titanium layer and an aluminum layer) as the gate electrode GEA.

In the display device which requires high definition, the pixels are small and the interval of adjacent signal lines S is also extremely small in the display area DA. For this reason, the electrodes for connecting the switching elements SW to the pixel electrodes PE are formed in a layer different from the signal lines S and are further formed as the transparent electrodes TE. Thus, an undesired contact between the signal lines S and the transparent electrodes TE can be avoided. In addition, the semiconductor SC connected to the transparent electrode TE in the aperture AP is also transparent. Therefore, the reduction in the transmittance in the aperture AP is prevented.

Figure 7:
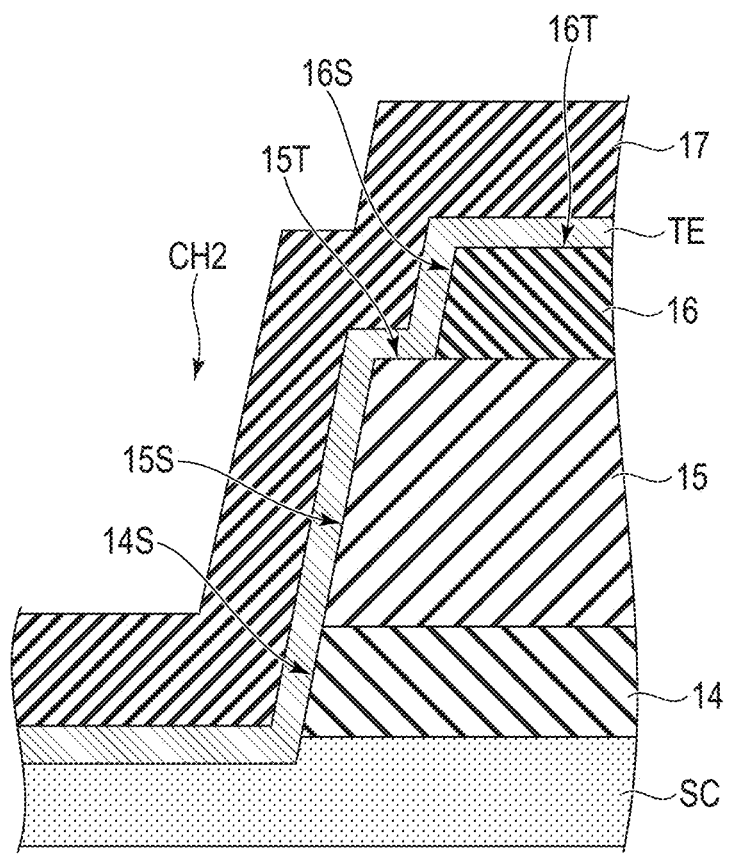
FIG. 7 is a cross-sectional view in which part of the contact hole CH2 shown in FIG. 6 is enlarged.

FIG. 7 is a cross-sectional view in which part of the contact hole CH2 shown in FIG. 6 is enlarged.

In the example shown in FIG. 7, regarding the insulating layers 14 to 16 stacked in the semiconductor SC (low-resistive area SCB), the insulating layer 14 and the insulating layer 15 are silicon oxide layers, and the insulating layer 16 is a silicon nitride layer. The silicon nitride layer functions as a blocking layer which prevents moisture from entering the semiconductor SC. In this configuration, the insulating layer 17 may be a silicon oxide layer or may be a silicon nitride layer.

For example, the contact hole CH2 is formed in the following manner. A resist which has been patterned into a predetermined shape is formed on the insulating layer 16. Subsequently, dry etching is performed using the resist as a mask. In the dry etching, after the removal of the insulating layer 16, the insulating layer 15 is removed, and further, the insulating layer 14 is removed.

At this time, the etching rate of silicon nitride is greater than that of silicon oxide. Thus, in the example shown in the figure, the insulating layer 16 is retracted relative to the insulating layer 15. The insulating layers 14 and 15 which are silicon oxide layers comprise side surfaces 14S and 15S facing the contact hole CH2, respectively. The side surfaces 14S and 15S are formed so as to be flush with each other (the same plane). To the contrary, a side surface 16S of the insulating layer 16 which is a silicon nitride layer is formed so as to be misaligned with the side surface 15S and overlaps the upper surface 15T of the insulating layer 15. Thus, the insulating layer 16 is formed such that the upper surface 15T of the insulating layer 15 is partly exposed.

The transparent electrode TE is continuously formed so as to be in contact with the semiconductor SC, the side surface 14S of the insulating layer 14, the side surface 15S and upper surface 15T of the insulating layer 15, and the side surface 16S and upper surface 16T of the insulating layer 16. The insulating layer 17 is formed so as to cover the transparent electrode TE.

In this manner, the discontinuity of the transparent electrode TE in the contact hole CH2 is prevented. Therefore, the semiconductor SC can be electrically connected to the pixel electrode PE via the transparent electrode TE in an assured manner. Thus, the reduction in the manufacturing yield can be prevented.

Figure 8:
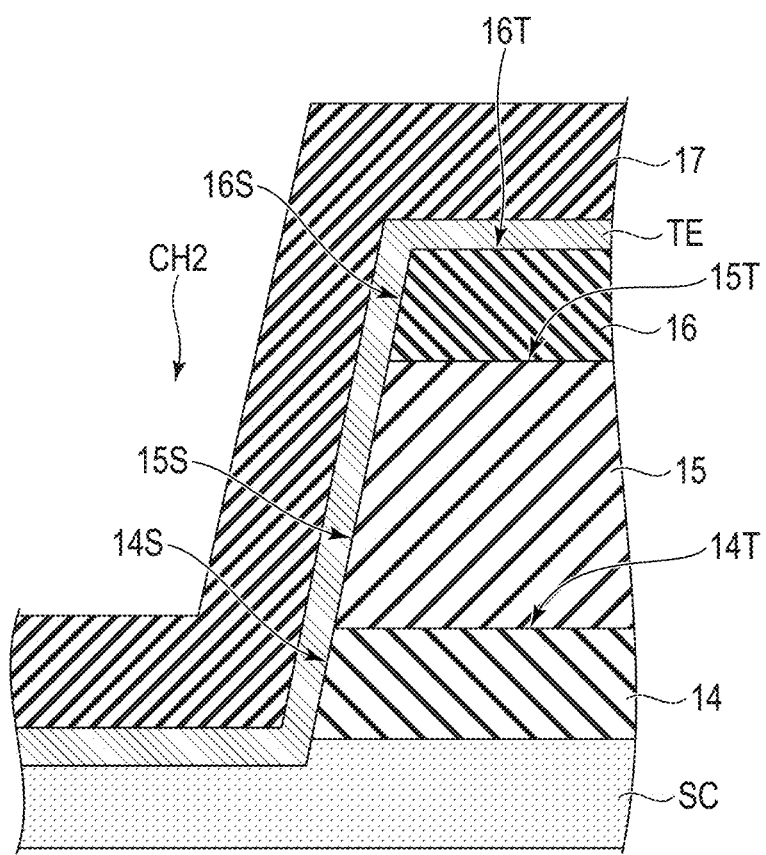
FIG. 8 is a cross-sectional view in which part of the contact hole CH2 shown in FIG. 6 is enlarged.

FIG. 8 is a cross-sectional view in which part of the contact hole CH2 shown in FIG. 6 is enlarged.

The example shown in FIG. 8 is different from the example shown in FIG. 7 in respect that all of the insulating layers 14 to 16 stacked in the semiconductor SC (low-resistive area SCB) are silicon oxide layers. In this configuration, the insulating layer 17 is a silicon nitride layer and functions as a blocking layer which prevents moisture from entering the semiconductor SC.

When the contact hole CH2 is formed by the dry etching described above, the side surface 14S of the insulating layer 14, the side surface 15S of the insulating layer 15 and the side surface 16S of the insulating layer 16 are formed so as to be flush with each other (the same plane). In other words, the insulating layer 15 is formed such that the upper surface 14T of the insulating layer 14 is not exposed. The insulating layer 16 is formed such that the upper surface 15T of the insulating layer 15 is not exposed.

The transparent electrode TE is continuously formed so as to be in contact with the semiconductor SC, the side surface 14S of the insulating layer 14, the side surface 15S of the insulating layer 15 and the side surface 16S and upper surface 16T of the insulating layer 16. The insulating layer 17 is formed so as to cover the transparent electrode TE.

In this example, similarly, the discontinuity of the transparent electrode TE in the contact hole CH2 is prevented. Therefore, the semiconductor SC can be electrically connected to the pixel electrode PE via the transparent electrode TE in an assured manner. Thus, the reduction in the manufacturing yield can be prevented.

Figure 9:
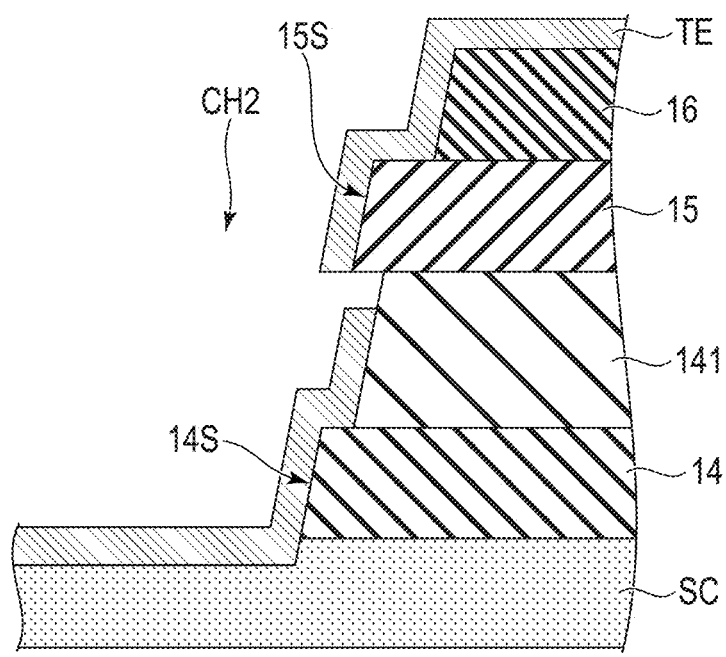
FIG. 9 is a cross-sectional view in which part of the contact hole CH2 of a comparative example is enlarged.

FIG. 9 is a cross-sectional view in which part of the contact hole CH2 is enlarged.

The example shown in FIG. 9 corresponds to a comparative example and is different from the example shown in FIG. 7 in respect that an insulating layer 141 which is a silicon nitride layer is interposed between the insulating layer 14 and the insulating layer 15.

When the contact hole CH2 is formed by the dry etching described above, the insulating layer 141 is retracted relative to the insulating layer 14 and the insulating layer 15. In other words, the recess of the insulating layer 141 is formed between the side surface 14S of the insulating layer 14 and the side surface 15S of the insulating layer 15. The insulating layer 15 is formed like eaves. When the transparent electrode TE is formed in the contact hole CH2 comprising this structure, there is a risk that the transparent electrode TE is disconnected in the recess of the insulating layer 141.

Contrary to this comparative example, in the present embodiment, no silicon nitride layer is included between the insulating layer 16 which is the base of the transparent electrode TE and the semiconductor SC. Thus, the formation of an undesired recess or the formation of eaves is prevented. This configuration allows the formation of the transparent electrode TE which is not disconnected in the contact hole CH2.

At least one of the insulating layer 16 and the insulating layer 17 is a silicon nitride layer which functions as a moisture blocking layer. Thus, the penetration of moisture into the semiconductor SC is prevented. The transistor characteristics of the switching element SW can be satisfactorily maintained. In this manner, the reduction in reliability can be prevented.

In the present embodiment, for example, the insulating layer 14 corresponds to a first insulating layer. The insulating layer 15 corresponds to a second insulating layer. The insulating layer 16 corresponds to a third insulating layer. The insulating layer 17 corresponds to a fourth insulating layer. The contact hole CH1 corresponds to a first contact hole. The contact hole CH2 corresponds to a second contact hole. The contact hole CH3 corresponds to a third contact hole.

All of the display devices that can be implemented by a person of ordinary skill in the art through arbitrary design changes to the display device described above as each embodiment of the present invention come within the scope of the present invention as long as they are in keeping with the spirit of the present invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or adding or omitting a step or changing the condition of a step, all of the modifications fall within the scope of the present invention as long as they are in keeping with the spirit of the invention.

Further, other effects which may be obtained from each embodiment and are self-explanatory from the descriptions of the specification or can be arbitrarily conceived by a person of ordinary skill in the art are considered as the effects of the present invention as a matter of course.

What is claimed is:

1. A display device comprising:
a substrate;
a transparent semiconductor provided above the substrate;
a first insulating layer which covers the semiconductor;
a gate electrode which is provided on the first insulating layer and intersects with the semiconductor;
a second insulating layer which covers the gate electrode;
a source electrode which is provided on the second insulating layer and is in contact with the semiconductor in a first contact hole penetrating the first insulating layer and the second insulating layer;
a third insulating layer which covers the source electrode;
a transparent electrode which is provided on the third insulating layer and is in contact with the semiconductor in a second contact hole penetrating the first insulating layer, the second insulating layer and the third insulating layer;
a fourth insulating layer which covers the transparent electrode;
a color filter provided on the fourth insulating layer;
a pixel electrode which is provided above the color filter, faces the color filter and is electrically connected to the transparent electrode; and
a common electrode which faces the pixel electrode, wherein
the fourth insulating layer comprises a third contact hole for connecting the transparent electrode to the pixel electrode,
the third contact hole overlaps the semiconductor in plan view,
the first insulating layer and the second insulating layer are silicon oxide layers,
at least one of the third insulating layer and the fourth insulating layer is a silicon nitride layer, and
in plan view, the third contact hole overlaps an intersection where the semiconductor and the gate electrode intersect with each other.

2. The display device of claim 1, wherein
the third insulating layer is a silicon nitride layer and is retracted such that an upper surface of the second insulating layer is partly exposed in the second contact hole.

3. The display device of claim 1, wherein
the third insulating layer is a silicon nitride layer and is formed such that an upper surface of the second insulating layer is not exposed in the second contact hole.

4. The display device of claim 1, further comprising a plurality of scanning lines and a plurality of signal lines, wherein
the scanning lines intersect with the signal lines,
one of the scanning lines includes the gate electrode,
one of the signal lines includes the source electrode,
the semiconductor and the transparent electrode extend to an aperture surrounded by the adjacent scanning lines and the adjacent signal lines in plan view, and
the second contact hole is located in the aperture and overlaps the color filter.

5. The display device of claim 1, wherein
the third contact hole does not overlap the color filter in plan view.

6. The display device of claim 4, further comprising:
a first substrate comprising the semiconductor, the scanning lines, the signal lines, the transparent electrode, the color filter, the pixel electrode and the common electrode;
a second substrate which faces the first substrate; and
a liquid crystal layer between the first substrate and the second substrate.

7. A display device comprising:
a substrate;
a transparent semiconductor provided above the substrate;
a first insulating layer which covers the semiconductor;
a gate electrode which is provided on the first insulating layer and intersects with the semiconductor;
a second insulating layer which covers the gate electrode;
a source electrode which is provided on the second insulating layer and is in contact with the semiconductor in a first contact hole penetrating the first insulating layer and the second insulating layer;
a third insulating layer which covers the source electrode;
a transparent electrode which is provided on the third insulating layer and is in contact with the semiconductor in a second contact hole penetrating the first insulating layer, the second insulating layer and the third insulating layer;
a fourth insulating layer which covers the transparent electrode;
a color filter provided on the fourth insulating layer:
a pixel electrode which is provided above the color filter, faces the color filter and is electrically connected to the transparent electrode; and
a common electrode which faces the pixel electrode, wherein
the fourth insulating layer comprises a third contact hole for connecting the transparent electrode to the pixel electrode,
the third contact hole overlaps the semiconductor in plan view,
the first insulating layer and the second insulating layer are silicon oxide layers,
at least one of the third insulating layer and the fourth insulating layer is a silicon nitride layer, and
the third contact hole is located between the first contact hole and the second contact hole on the semiconductor.

8. The display device of claim 4, wherein
the first contact hole and the second contact hole do not overlap any of the scanning lines.

9. The display device of claim 1, further comprising a first scanning line, a second scanning line and a plurality of signal lines, wherein
the first scanning line and the second scanning line intersect with the signal lines,
the first scanning line and the second scanning line are electrically connected to each other,
the second scanning line overlaps the first scanning line, and
the third contact hole overlaps the first scanning line and the second scanning line.

10. The display device of claim 9, wherein
both the first contact hole and the second contact hole do not overlap either the first scanning line or the second scanning line.

11. The display device of claim 1, further comprising a filling material and an alignment film, wherein
a recess generated by the third contact hole is filled with the filling material, and
the filling material is formed of an organic insulating material different from that of the alignment film.

12. The display device of claim 1, further comprising an organic insulating layer, wherein
the organic insulating layer covers the color filter, and
the pixel electrode is in contact with the organic insulating layer, and is not contact with the color filter.

13. The display device of claim 1, wherein
the semiconductor comprises a recess portion overlapping the second contact hole, and
the transparent electrode is in contact with the recess portion.

* * * * *